April 11, 1961 C. E. MAIDEN 2,979,645
HIGH VOLTAGE SEMICONDUCTOR RECTIFIER
Filed Dec. 8, 1958 2 Sheets-Sheet 1
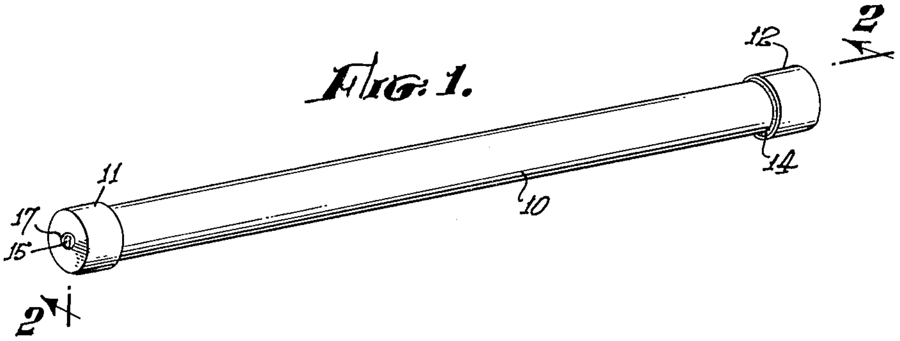
FIG. 1.
FIG. 2.
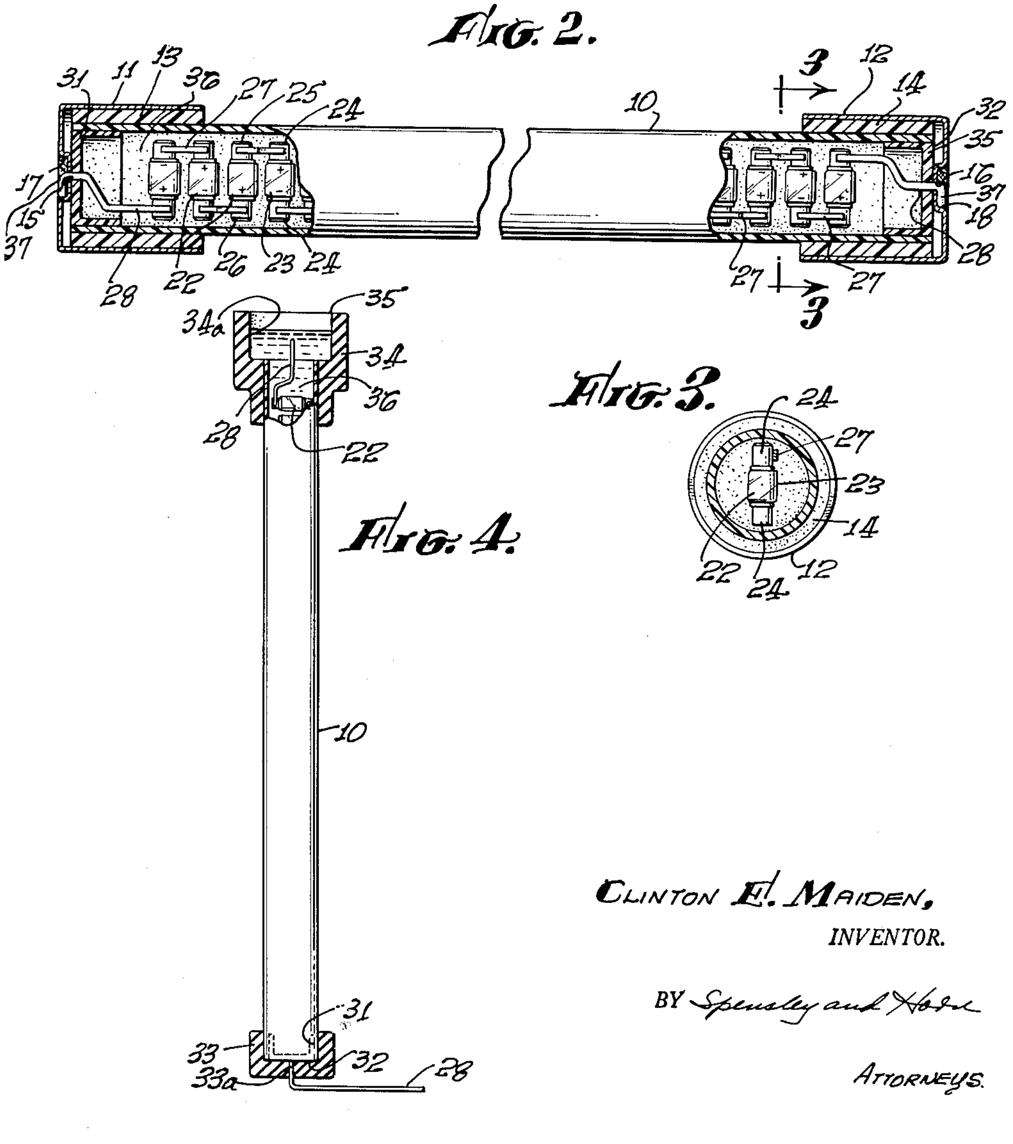
FIG. 3. FIG. 4.
CLINTON E. MAIDEN,
INVENTOR.
BY Spensley and Horn
ATTORNEYS.

CLINTON E. MAIDEN,
INVENTOR.

BY Spensley and Horn

ATTORNEYS.

United States Patent Office 2,979,645

Patented Apr. 11, 1961

2,979,645

HIGH VOLTAGE SEMICONDUCTOR RECTIFIER

Clinton E. Maiden, Canoga Park, Calif., assignor to Pacific Semiconductors, Inc., Culver City, Calif., a corporation of Delaware Filed Dec. 8, 1958, Ser. No. 779,271

5 Claims. (Cl. 317—234)

This invention relates to a high voltage rectifier and more particularly to a high voltage rectifier of improved construction employing semiconductor electrical translating devices as the active elements.

In accordance with the prior art, high voltage rectifiers generally designed to accomplish the purposes and objectives of the present invention have many failings. One such rectifier includes a central ceramic tube within which are placed a plurality of silicon crystals which include an alloyed P-N junction.

Within the ceramic tube at opposite ends thereof there is placed an aluminum spacer which makes contact with the adjacent silicon crystal. On the opposite sides of the two aluminum spacers there is provided a spring to apply a mechanical compressive force to the silicon crystals. A pair of metal caps seal off the opposite ends of the tube to complete the package. The individual silicon crystals which have a small outside diameter relative to the inside diameter of the ceramic tube are mounted upon a disc-shaped metallic member whose outside diameter is slightly smaller than the inside diameter of the ceramic tube. On one side of each of the discs supporting the silicon crystals there is placed a disc-shaped bronze spring while on the other side of each of these discs is an annular shaped insulator spacer through which the silicon crystal may make contact with the next bronze spring and so forth. Thus, all of the silicon crystals are electrically connected in series. In order to affect a seal of the hereinabove described package, the ceramic tube is metallized at the opposite ends thereof and solder is used to join these ends to the opposing metal caps.

The hereinabove described present art high voltage rectifier has many limitations. The seal between the metal caps and the ceramic tube being a solder seal limits the operation, even for a relatively short period of time, of the rectifier to temperatures below 150° C. Further, the solder seal does not produce a truly effective hermetic seal making the characteristics of the device in operation more susceptible to variations in humidity, temperature, and other environmental conditions.

Additionally, the many surface-to-surface pressure contacts result in unsatisfactory electrical performance under conditions of mechanical shock, vibration, and temperature cycling. There is a tendency for deterioration of the contact surfaces over an extended period of time.

The heat transfer (power dissipated at the P-N junction) from the inner most crystals must essentially take place along the length of the rectifier as the radial heat transfer path through the wall of the ceramic tube is very poor. Further, the use of a ceramic tube makes the rectifier highly susceptible to breakage.

The high voltage semiconductor rectifier of the present invention on the other hand, overcomes all of the above limitations.

In accordance with the presently preferred embodiment of this invention, a plurality of semiconductor rectifiers housed in a glass-to-metal seal package of the type described and claimed in United States Patent No. 2,815,474, issued December 3, 1957, entitled "Glass Sealed Semiconductor Rectifier," by William M. Lewis, Jr. and Henry D. Frazier, are placed in side by side relationship and are electrically and mechanically connected in series by the use of nickel clad copper wire. The resulting series diode assembly is then placed within a relatively thin walled plastic tube. The plastic tube is filled with a plastic resin and two plastic caps are inserted within opposite ends of the plastic tube. Extending wires connected to each of the two opposed end diodes in the sub-assembly pass through small holes provided therefore in the plastic caps. Two metal caps which fit over the opposite ends of the plastic tube are sealed to the tube by plastic in a manner hereinafter to be explained. The two end metal caps also include holes through the ends thereof to permit the passage therethrough of the extending wires. The wires are then clipped off and the ends thereof which are flush with the metal caps are soldered thereto.

It is an object of the present invention to provide a high voltage semiconductor rectifier with voltage ratings in excess of 1500 volts.

Another object of the present invention is to provide a high voltage semiconductor rectifier which is compact in size and rugged of construction.

Yet another object of the present invention is to provide a rectifier of the character described which will insure reliable operation under extreme environmental conditions including high mechanical shock and elevated temperature.

A further object of the present invention is to provide a semiconductor rectifier of the "fuse-clip" type of improved construction which includes a hermetic seal of the highest order of reliability.

The novel features which are believed to be characteristic of the present invention, together with further objects and advantages thereof, will be better understood from the following description in which the invention is illustrated by way of example. It is to be expressly understood, however, that this description is for the purpose of illustration only and that the true spirit and scope of the invention is defined by the accompanying claims.

In the drawings:

Figure 1 is a perspective view showing a high voltage rectifier in accordance with the presently preferred embodiment of this invention;

Figure 2 is an enlarged view, partly in section, taken along line 2—2 of Figure 1;

Figure 3 is a view taken along line 3—3 of Figure 2;

Figure 4 is a view, partly in section, of the rectifier of Figure 1 during an intermediate stage of production;

Figure 5:
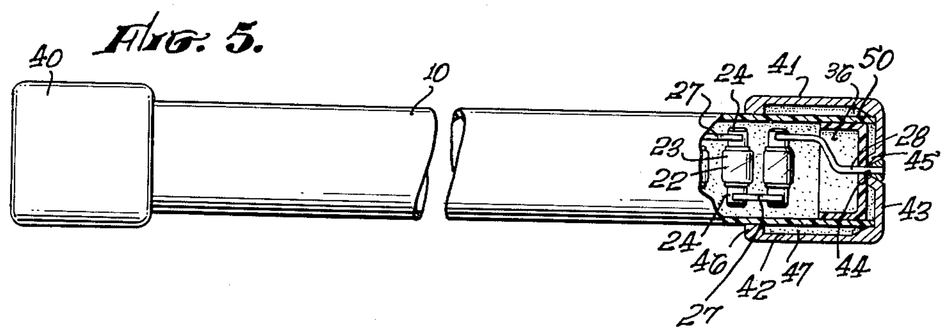
Figure 5 is an enlarged front elevation of a first alternative embodiment of a rectifier constructed in accordance with the present invention.

Referring now to the drawings and more particularly to Figure 1, there is shown a high voltage semiconductor rectifier which includes a central relatively thin walled plastic tube 10. Tube 10 is preferably made of a plastic resin such as a filled epoxy. One such epoxy which has been found particularly satisfactory is Shell Epon #828 with 12% silica filling. Alternatively, a laminated epoxy impregnated woven fiberglass or a melamine woven glass laminate, or the like may be used as the material for tube 10. Hermetically sealed to opposite ends of the tube 10 are two brass end cups 11 and 12 which are preferably nickel plated with a layer of nickel from 0.0002–0.0003 inch. The wall thickness of the cups 11 and 12 will typically be approximately .010 inch. Fitted within each of the end caps 11 and 12 are laminated epoxy impregnated woven fiberglass sleeves 13 and 14 which may best be seen in Figure 2. The sleeves 13 and 14 fill the space between the end caps 11 and 12 and the outer wall of the tube 10. Small hole 15 and 16 of the order of 0.040 inch are provided within the dimpled depressions 17 and 18 at the end of each of the caps 11 and 12.

The active element of the high voltage rectifier in accordance with the present invention consists of a plurality of glass-to-metal hermetically sealed silicon rectifiers 22. The rectifiers 22 each include a central glass cylinder 23 into which are inserted a pair of metal sleeves 24 (typically Kovar). The sleeves 24 are fused to the glass cylinder 23 to provide a hermetic seal therebetween. A pair of opposed metal pins 25 and 26 are inserted therewithin to complete the housing. A silicon P-N junction crystal is in contact with the pins 25 and 26, the crystal being the active electrical element which provides the rectification.

In assembly, a series of rectifiers 22 are aligned in side by side relationship, spaced slightly apart, with their central axes being parallel, one to the other. Each adjacent rectifier is reversed in direction so that the cathode of one rectifier is next to the anode of its neighbor. The rectifiers are then joined together in series, by welding, using short lengths of nickel wires 27 of approximately 0.020–0.030 inch. The two end rectifiers each have welded thereto, at the ends not connected to the adjacent rectifier, a wire 28 longer than wires 27. Wires 28 are each bent so that the ends opposite the rectifiers are coaxial with the center-line running through the series of diodes as may best be seen in Figure 2.

The sub-assembly consisting of the joined rectifiers 22 with the extending end wires 28 is then placed within the hollow tube 10 which is placed in a vertical position as shown in Figure 4. A short epoxy cap 31 having an outside diameter, O.D., substantially equal to the inside diameter, I.D., of the tube 10 is inserted within the bottom of the tube so that the back surface 32 of the cap 31 is flush with the end of the tube 10. Thereafter, a pre-formed silicone rubber cap 33 (which may be Dow-Corning Silastic #5313, resin and #5314, catalyst) is placed into position about the bottom of tube 10. The I.D. of the cap 33 is made slightly smaller than the O.D. of the tube 10 resulting in a tight seal when the cap 33 is placed into position. It will be appreciated that the cap 33 being somewhat elastic may be stretched over the end of the tube 10. A small hole 33*a* is provided through the cap 33 on a line with the central axis of the tube 10 to permit the bottom extending wire 28 to pass through while further maintaining a substantially complete enclosure of the bottom tube 10. A second silicone rubber member 34 in the shape of a funnel is placed over the tube 10. Funnel 34 defines a central opening 34*a* which is slightly larger than the O.D. of the tube 10. Epoxy resin is then poured into the funnel 34 filling all of the space not occupied by the rectifier sub-assembly within the tube 10. An epoxy resin which has proved to be particularly satisfactory, is Stycast #2741, which is an epoxide casting resin with adjustable flexibility manufactured by Emerson and Cuming, Inc. of Canton, Massachusetts. The entire assembly as shown in Figure 4 is placed within an oven and subjected to a vacuum of between 20–25 inches of mercury two or more times until filled with resin. After the assembly of Figure 4 is removed from the oven, excess epoxy is removed from the surface of the tube 10 and a second cap 35 is placed within the opposite end of tube 10 while the epoxy filler designated as 36 in Figure 2 has not yet hardened. The assembly is then placed in a curing oven for approximately three hours at a temperature of approximately 302° F. The assembly is then removed from the oven and permitted to cool.

Next, the two end caps 11 and 12 have placed therewithin plastic sleeves 13 and 14 which have been coated on the O.D. and end surfaces with Stycast #2741 epoxy resin. The sleeves are then forced into the end caps 11 and 12 and the cap-sleeve sub-assemblies are placed in an oven and heated to approximately 158° F. for approximately half an hour. The cap-sleeve sub-assemblies are removed from the oven and permitted to cool. A coating of epoxy resin is then placed within the end cap and the end cap is placed over the opposite ends of the tube 10 and the entire tube assembly is then placed in an oven at a temperature of 150° F. for approximately half an hour. Now the assembly is removed from the oven and permitted to cool after which excess resin is removed from the holes 15 and 16 through which the wires 28 pass. The wire leads 28 are then crimped to within 1/32 of an inch from the end surfaces of the caps 11 and 12. The short extension of wires 28 will bear against the bottom surface of depressions 17 and 18 and thereafter solder is applied at 16 and 15 (see Figure 2), thus completing the rectifier. A solder which has been found to be particularly satisfactory for this purpose consists of 95% tin and 5% antimony.

In Figure 5 there is shown an alternate embodiment of a rectifier in accordance with the present invention. The only difference between the rectifier of Figures 1 and 2 and that shown in Figure 5 is the design of the metal end caps 40 and 41. These end caps do not include a plastic sleeve but instead are shaped so that direct contact exists between the caps at flange 46 and the plastic tube 10. The metal caps 40 and 41 define a central opening 42 which is coaxial with and slightly larger than the O.D. of the tube 10. At the closed end 43 of the caps, at the center thereof, is a generally cone-shaped opening 44 whose diameter approximates that of the wire 28. The walls 45 are bent in a way from the end 43 in order to insure a better seal when the plastic filler resin 36 is added. At the other end of the cap there is an inward extending flange section 46 which is at an angle of approximately 90° with the centerline of the cap. The flange 46 defines an opening whose diameter is approximately equal to the outside diameter of the tube 10. Thus, a hollow section 47 exists which will be filled with the filler resin when the tube 10 is filled in the manner hereinbefore described in connection with the embodiment of Figures 1 and 2. At the end of the hollow section 47 near the closed end 43 is a bevel at 50.

Figure 6:
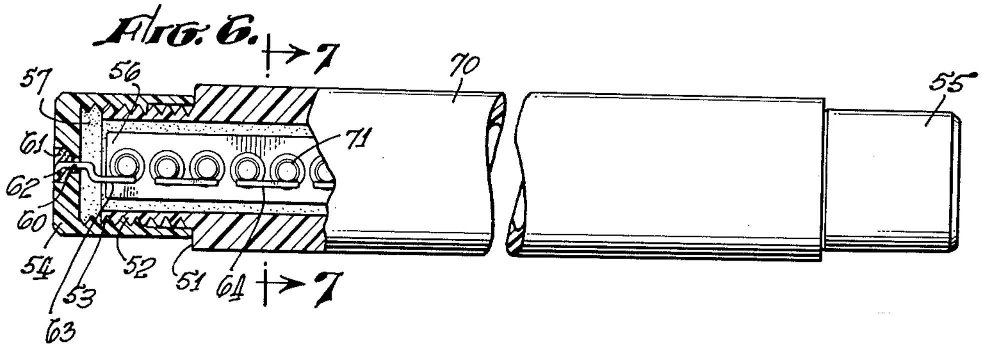
Figure 6 is an enlarged front elevation of a second alternative embodiment of a rectifier constructed in accordance with the present invention.
Figure 7:
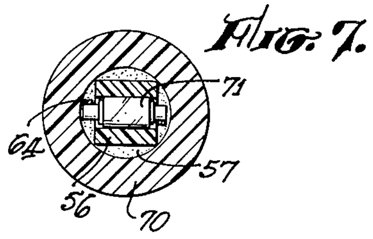
Figure 7 is a view taken along line 7—7 of Figure 6.

Referring now to Figures 6 and 7, there is shown another alternate embodiment of a rectifier constructed in accordance with the present invention. In general, the construction of this device is quite similar to that of the embodiment of Figures 1 and 2. It includes a central tube or cartridge 70 made of plastic. While an epoxy or fiberglass may be used for tube 70 it has been found preferable to use a plastic which is a polymer of trifluorochloroethylene characterized by the formula $[CF_2—CF—Cl]X$ manufactured under the trade name "Kel-F" by the M. W. Kellogg Company. The characteristics of this material are as follows: It possess extreme chemical resistance, has a high zero moisture absorption, has a high compressive strength (from 30 to 80,000 p.s.i. at 77° F.), has a wide temperature range of service (from −195° C. to +200° C.), has a high impact strength at both high and low temperatures, it is able to withstand a substantial thermal shock, it has excellent electrical properties (a high dielectric strength) and has a high arc resistance. The tube 70 is stepped down to a smaller outside diameter near both ends thereof at shoulder 51. The stepped down extensions 52 are threaded over the length thereof as is indicated by numeral 53. Despite the reduction in the outside diameter of tube 70 at the ends thereof, its inside diameter remains constant over the entire length.

Figure 8:
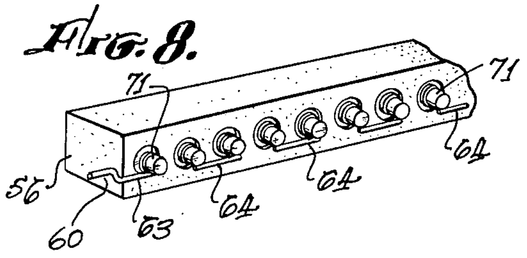
Figure 8 is a perspective view showing a section of the magazine disposed within the rectifier assembly of Figure 6.

A plastic magazine member 56, which may best be seen in Figure 8, defines a plurality of holes therethrough to receive the individual rectifiers 71. The diameters of the holes in the magazine being such that the rectifiers are essentially press fit therein. The magazine may be any plastic material which is chemically inert and which is relatively strong and tough and will withstand a wide temperature range. A material which has been found to be particularly satisfactory for this purpose is Kel-F. The individual rectifiers 71 are loaded in the magazine 56 with each in the opposite direction so that the anode of one is adjacent the cathode of the next rectifier. After the rectifiers or diodes 71 are all in place, wires 64 are welded intermediate every other pair of diodes so that they will all thus effectively be joined in series. End leads 63 are then welded to each of the end diodes in the magazine at the ends to which wires 64 are not connected. The end wires 63 are bent at 60 in order to have the extending ends thereof be coaxial with the centerline of the magazine. Now the magazine is placed within the cartridge 70 of Figure 6. Two metal end caps 54 and 55 which are internally threaded are screwed on to the threaded end extensions of the cartridge. After, a sealing material such as epoxy resin is applied to the threads to insure a hermetic seal between the caps and the tube. The end caps are tightened to produce a compression seal with shoulders 51. The thus assembled unit is then heated to cure the epoxy resin to form an effective hermetic seal between the caps and the tube, by heating at a temperature of from 80° to 90° C. for approximately thirty minutes. One of the end wires 60 is then bent over as at 62 and the hole 60 is filled with a high temperature solder such as 95% tin-5% antimony to effect a hermetic seal of the cap. With the other cap not yet so soldered, the cartridge is placed within a vacuum chamber and epoxy resin of the type used with the above described embodiments is poured into the cartridge under approximately one atmosphere of pressure through the hole in cap 55 which has not yet been soldered. Now the epoxy filler 57 is cured by a two step process, the first step called the initial cure calls for the assembly to be heated to a temperature of approximately 80° C. for approximately sixteen hours. It is then post cured to a temperature of approximately 150° C. for approximately three hours. Finally, the cap 55 is solder sealed in the same manner as described with respect to cap 54.

Representative ratings of devices produced in accordance with the present invention are as follows: In a rectifier including 38 diodes construed in accordance with the embodiment of Figures 6 and 7, the overall length is a 6 1/16", the O.D. is 5/8", and the diameter of the caps is 0.545". Typical electrical characteristics are: peak inverse voltage of 19,000 volts with one microamp leakage current at 16,000 volts and a forward voltage drop of 30 volts. Such a device has a typical maximum power dissipation of 6.5 watts. A device such as that shown in the first two embodiments, for a diode arrangement is similar to that above recited except that the maximum power dissipation is 9 watts. This is basically due to the fact that the cartridge of this embodiment is thinner walled than the above described embodiment and further has a smaller O.D., it being 7/16". The thickness of the wall of the embodiment of Figures 1, 2 and 5 is nominally 1/16 of an inch, while the thickness of the wall in Figures 6 and 7 is nominally 1/8 of an inch.

It will be appreciated that while representative figures have been given for a particular configuration, that a different configuration using a greater or lesser number of diodes of different individual characteristics will permit rectifiers having different operating parameters as desired.

There has thus been described a new and improved hermetically sealed high voltage rectifier. The rectifier includes a triple hermetically sealed package. It is composed of a plurality of individually hermetically sealed diodes, connected by welded joints, potted in a shock resistant, moisture resistant resin. Finally, the outside package is hermetically sealed by solder at the small holes in the end caps and by the epoxy intermediate the ends of the cartridge and the inside of the metal caps. These rectifiers have successfully withstood day temperature cycling of +150° C. to −65° C. followed by 16–18 hours immersion in water without damage visually or electrically. Further shock and vibration tests produce no change in rectifier characteristics. Subjection of these rectifiers to temperatures of approximately 200° C. for short periods of time produced no adverse effects.

What is claimed is:

1. A high voltage semiconductor rectifier comprising: a plurality of semiconductor diodes, each of said diodes being individually hermetically sealed within a cylindrical package having a cathode terminal at one end thereof and an anode terminal at the other and thereof, said diodes being arranged in side-by-side relationship and oriented so that contiguous terminals of adjacent diodes are oppositely polarized, said diodes being so held in a compact assemblage by conductors welded to predetermined continuous diode terminals to thereby electrically connect said diodes in series, means for hermetically sealing said assemblage; and means for providing at least two electrical connections to said assemblage.

2. A high voltage semiconductor rectifier comprising: a plurality of semiconductor diodes, each of said diodes being individually hermetically sealed within a cylindrical glass-to-metal package having a cathode terminal at one end thereof and an anode terminal at the other end thereof, said diodes being arranged in side-by-side relationship and oriented so that contiguous terminals of adjacent diodes are oppositely polarized, said diodes being so held in a compact assemblage by conductors welded to predetermined contiguous diode terminals to thereby electrically connect said diode in series relationship; means for hermetically sealing said assemblage; and means for providing at least two electrical connections to said assemblage, said last named means being hermetically sealed to said assemblage.

3. A hermetically sealed high voltage rectifier comprising: a plurality of semiconductor diodes, each of said diodes being individually hermetically sealed within a cylindrical glass-to-metal package having a cathode terminal at one end thereof and an anode terminal at the other end thereof, said diodes being arranged in side-by-side relationship and oriented so that contiguous terminals of adjacent diodes are oppositely polarized, said diodes being so held in a compact assemblage by nickel conductors welded to predetermined contiguous diode terminals to thereby electrically connect said diodes in series relationship; a plastic cartridge enclosing said assemblage; a plastic filler material disposed within and filling said cartridge to thereby encapsulate said assemblage of diodes; a pair of metal caps hermetically sealed to said cartridge at opposite ends thereof; and means for electrically connecting said metal caps to said series connected diodes.

4. A hermetically sealed high voltage rectifier comprising: a magazine made of insulator material, said magazine defining a plurality of openings therethrough; a plurality of semiconductor diodes, said diodes being disposed within said openings within said magazine; means electrically interconnecting said diodes in series relationship; a plastic cartridge enclosing said magazine; a plastic filler material disposed within and filling said cartridge to thereby encapsulate said magazine including said diodes; a pair of metal caps hermetically sealed to said cartridge at opposite ends thereof; and means for electrically connecting said metal caps to said series connected diodes.

5. A hermetically sealed high voltage rectifier comprising: a magazine made of a plastic material, said material being a polymer of trifluorochloroethylene, said magazine defining a plurality of openings therethrough; a plurality of semiconductor diodes, said diodes being individually hermetically sealed in a glass-to-metal package, said diodes being disposed in said magazine; nickel wire means electrically connecting said diodes in series relationship; a plastic cartridge enclosing said magazine, said cartridge being made of a polymer of trifluorochloroethylene; an epoxy plastic material disposed within and sealing said cartride to thereby encapsulate said magazine and said diodes; a pair of metal caps hermetically sealed to said cartridge to opposite ends thereof; and means for electically connecting said metal caps to said series connected diode.

References Cited in the file of this patent

UNITED STATES PATENTS

| | | |
|---|---|---|
| 2,431,348 | Skinker | Nov. 25, 1947 |
| 2,516,344 | Ross et al. | July 25, 1950 |
| 2,827,597 | Lidow | Mar. 18, 1958 |
| 2,854,609 | Hedding | Sept. 30, 1958 |
| 2,892,135 | Woods | June 23, 1959 |
| 2,921,245 | Wallace et al. | Jan. 12, 1960 |